United States Patent
Turner

(10) Patent No.: US 7,659,918 B2
(45) Date of Patent: Feb. 9, 2010

(54) APPARATUS AND METHODS FOR ADJUSTING THE ROTATIONAL FREQUENCY OF A SCANNING DEVICE

(75) Inventor: Arthur Monroe Turner, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1068 days.

(21) Appl. No.: 10/680,928

(22) Filed: Oct. 8, 2003

(65) Prior Publication Data

US 2005/0078169 A1    Apr. 14, 2005

(51) Int. Cl.
  *B41J 2/435*   (2006.01)
  *B41J 15/14*   (2006.01)
  *B41J 2/47*    (2006.01)
  *H04N 1/04*    (2006.01)

(52) U.S. Cl. .............. 347/230; 347/241; 347/239; 358/474

(58) Field of Classification Search .......... 347/230, 347/239, 241; 358/474
See application file for complete search history.

(56) References Cited

U.S. PATENT DOCUMENTS

| | | | | |
|---|---|---|---|---|
| 3,544,201 A | * | 12/1970 | Schlafer et. al. | 359/224 |
| 4,945,765 A | * | 8/1990 | Roszhart | 73/514.29 |
| 5,471,086 A | * | 11/1995 | Ipposhi et al. | 257/417 |
| 5,629,790 A | * | 5/1997 | Neukermans et al. | 359/198 |
| 5,648,618 A | * | 7/1997 | Neukermans et al. | 73/862.08 |
| 5,841,553 A | * | 11/1998 | Neukermans | 358/494 |
| 6,044,705 A | * | 4/2000 | Neukermans et al. | 73/504.02 |
| 6,681,063 B1 | * | 1/2004 | Kane et al. | 385/18 |
| 6,879,418 B2 | * | 4/2005 | Swartz et al. | 359/196 |
| 2001/0019445 A1 | * | 9/2001 | Ueda | 359/290 |
| 2001/0033410 A1 | * | 10/2001 | Helsel et al. | 359/290 |
| 2003/0021613 A1 | * | 1/2003 | Koide | 399/167 |
| 2003/0169055 A1 | * | 9/2003 | Klement | 324/652 |
| 2004/0007069 A1 | * | 1/2004 | Turner et al. | 73/580 |
| 2004/0114110 A1 | * | 6/2004 | Shin | 353/31 |
| 2004/0135644 A1 | * | 7/2004 | Mizoguchi et al. | 331/154 |

\* cited by examiner

*Primary Examiner*—Stephen D Meier
*Assistant Examiner*—Sarah Al-Hashimi
(74) *Attorney, Agent, or Firm*—William B. Kempler; Wade J. Brady, III; Frederick J. Telecky, Jr.

(57) ABSTRACT

The present invention provides methods and apparatus for adjusting the resonant frequency, scan velocity or other parameters of a pivotally functional surface such as an oscillating mirror used as the scanning engine of a laser printer or projection display. The selected parameter is adjusted by the application of tensional or compression stress to the torsional hinges of the mirror. According to one embodiment, the appropriate stress is generated by a slice of piezoelectric material bonded to the mirror device itself or to other portions of the support structure of the scanning engine.

14 Claims, 13 Drawing Sheets

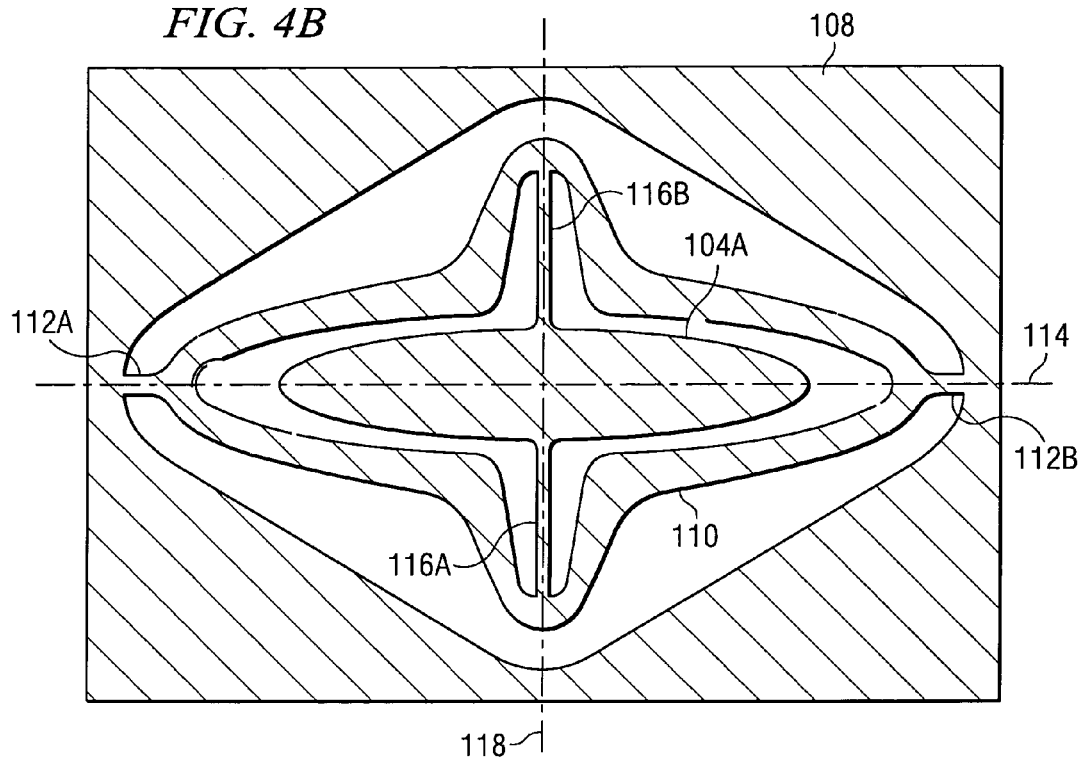
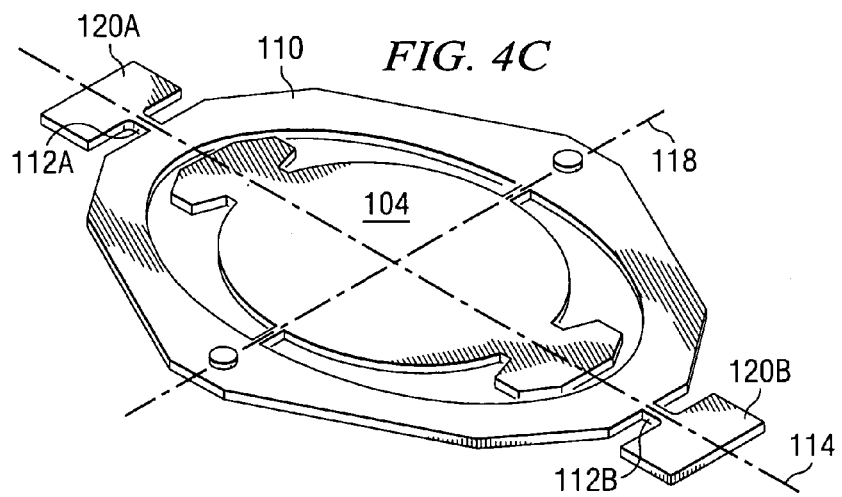

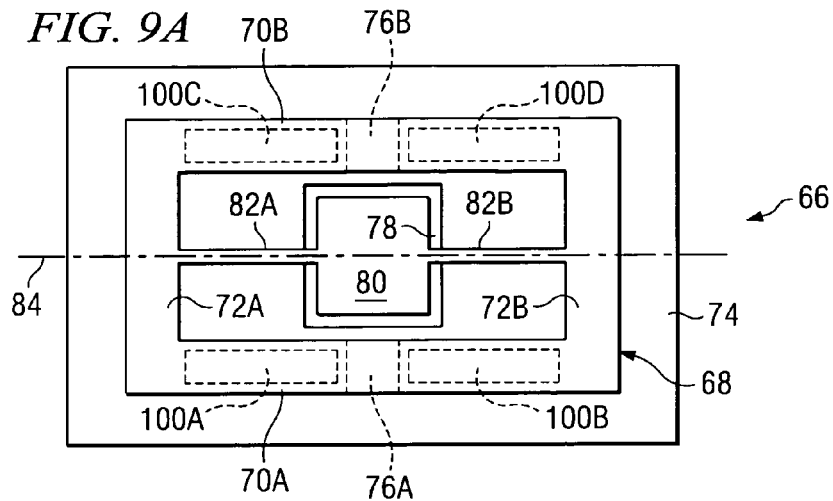
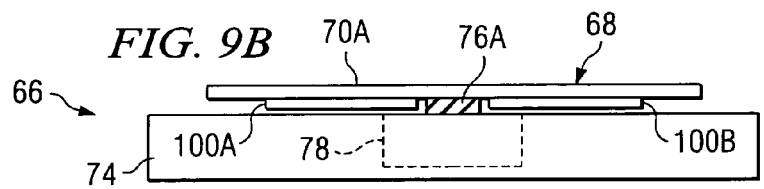
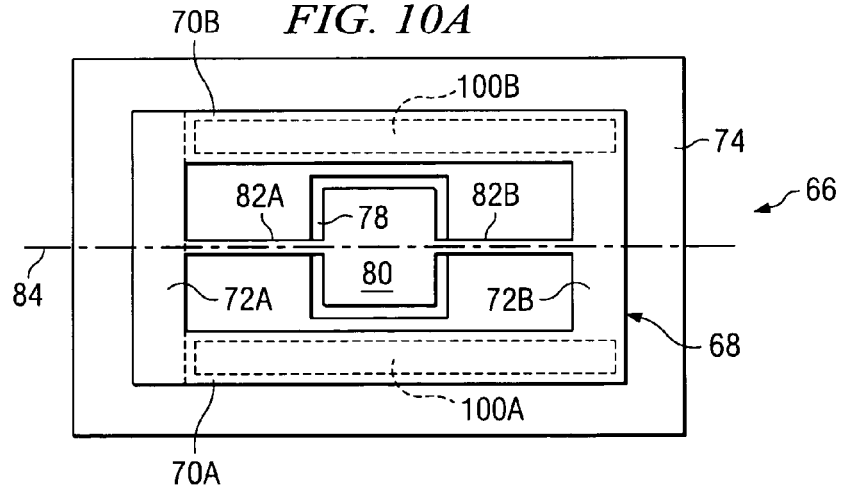
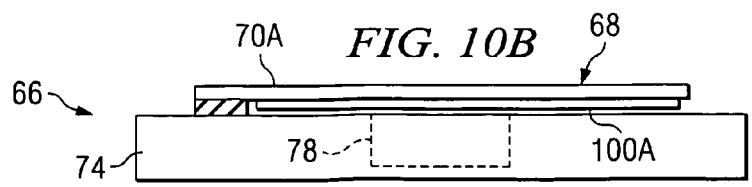

APPARATUS AND METHODS FOR ADJUSTING THE ROTATIONAL FREQUENCY OF A SCANNING DEVICE

TECHNICAL FIELD

The present invention relates generally to the field of torsional hinge MEMS scanning engines, and more particularly to methods and apparatus for reducing or eliminating variations in the resonant frequency and/or scan velocity of the beam scan caused by environmental factors such as temperature.

BACKGROUND

The use of rotating polygon scanning mirrors in laser printers to provide a beam sweep or scan of the image of a modulated light source across a photoresistive medium, such as a rotating drum, is well-known. In addition, there have also been efforts to use a much less expensive flat mirror with a single reflective surface, such as a mirror oscillating in resonance to provide the scanning beam. Earlier efforts to use the inexpensive flat mirror required a compromise in performance in that only one direction of the resonant beam sweep could be used to display or print an image line at a right angle on a page. For example, to generate image lines that are at a right angle to a moving photosensitive medium, the scanning mirror generating the beam sweep is typically mounted at a slight angle to compensate for the movement of the photosensitive medium. It will be appreciated that the photosensitive medium typically moves at a right angle with respect to the beam sweep (such as a rotating drum). Unfortunately, if the mirror is mounted at a slight angle to compensate for medium movement during the forward beam sweep, the return beam sweeps will traverse a trajectory on the moving photosensitive drum which will be at an angle which is unacceptable with the first printed image line since the effect of the moving medium and the angle mounting of the mirror will now be additive rather than subtractive. Thus, when such a single reflecting surface resonant mirror was used with these early flat mirror scanners, it was necessary to interrupt the modulation of the reflected light beam and wait for the mirror to complete the return sweep or cycle and then again start scanning in the original direction. This requirement of only using one of the sweep directions of the mirror of course reduces the print speed and requires synchronization between the mirror and the rotating drum.

More recently, the use of a single flat mirror with two pairs of torsional hinges arranged orthogonally to each other or two single hinged mirrors have allowed bi-directional sweeps by controlling the vertical position of the mirror during the horizontal scan or sweep. For example, the assignee of the present invention has recently developed a printer scanning engine that uses a dual axis mirror with a single reflection surface described in U.S. patent application Ser. No. 10/384,861 filed Mar. 10, 2003, and entitled "Laser Print Apparatus Using a Pivoting Scanning Mirror." This dual axis mirror uses a first set of torsional hinges for providing oscillating beam sweep such as a resonant beam sweep and a second set of torsional hinges that selectively moves the oscillating beam sweep in a direction orthogonal to the oscillating or resonant beam sweep. By dynamically controlling the orthogonal position of the beam sweep to compensate for movement of the photosensitive medium, both directions of the resonant beam sweep may be used to print parallel image lines. Alternately, two single axis mirrors can be arranged such that one mirror provides the resonant beam sweep and the other mirror controls the orthogonal position of the beam sweep to allow both directions of the resonant beam sweep to be used for printing.

It will also be appreciated by those skilled in the art that in addition to laser printing, control of the orthogonal (vertical) position of the oscillating or resonant scan by a first single axis mirror allows a second single surface or flat oscillating mirror to be used to provide a full frame of raster scans suitable for use on projection displays including micro projection displays such as cell phones, Personal Digital Assistants (PDA's), notebook computers and heads-up displays. However, if such displays are to be commercially acceptable, they must be small, low cost, robust enough to withstand greater than 1000 G's of shock, and stable over the operating temperature normally experienced by hand-held products.

Consequently, it will be appreciated that the high frequency scanning mirror is a key component to the success of such products. Further, since many of the applications for such mirror projection displays are battery powered, all of the components (including the scanning mirror) must be energy efficient.

Texas Instruments presently manufactures mirror MEMS devices fabricated out of a single piece of material (such as silicon, for example) typically having a thickness of about 100-115 microns using semiconductor manufacturing processes. The layout of a dual axis mirror consists of a mirror having dimensions on the order of a few millimeters supported on a gimbals frame by two silicon torsional hinges. The gimbals frame is supported by another set of torsional hinges, which extend from the gimbals frame to a support frame or alternately the hinges may extend from the gimbals frame to a pair of hinge anchors. This Texas Instruments manufactured mirror with two orthogonal axes is particularly suitable for use with laser printers and/or projection displays. The reflective surface of the mirror may have any suitable perimeter shape such as oval, rectangular, square or other.

Similar single axis mirror devices may be fabricated by eliminating the support frame altogether and extending the single pair of torsional hinges of the mirror directly to the support frame or a pair of support anchors. The use of two single axis mirrors may be used instead of one dual axis mirror to generate the beam scan and any necessary orthogonal beam movement. Other suitable designs of single axis mirrors may also be used.

U.S. patent application Ser. No. 10/384,861 describes several techniques for creating the pivotal resonance of the mirror device about the torsional hinges. Thus, by designing the mirror hinges to resonate at a selected frequency, a scanning engine can be produced that provides a scanning beam sweep with only the small amount of energy required to maintain resonance.

As will be appreciated by one skilled in the art, the resonant frequency of a pivotally oscillating device about torsional hinges will vary as a function of the stress loading along the axis of the hinges. These stresses build up as a result of residual stress on the hinge from the assembly process as well as changes in the environmental conditions, such as for example, changes in the temperature of the packaged device. For example, the Young's modulus of silicon varies over temperature such that for a MEMS type pivotally oscillating device made of silicon, clamping the device in a package such that it is restrained in the hinge direction will cause stress in the hinges as the temperature changes. This in turn will lead to drift in the resonant frequency of the pivotal oscillations.

Since applications that use a pattern of light beam scans, such as laser printing and projection imaging require a stable and precise drive to provide the signal frequency and scan velocity, the changes in the resonant frequency and scan velocity of a pivotally oscillating device due to temperature variations can restrict or even preclude the use of the device in laser printers and scan displays. Further, if the stress loading is increased above the maximum acceptable levels for a given rotational angle, the reliability and operational life of the device can be unacceptably reduced. For example, excessive compressive stress loading that can occur at low temperature on devices with a CTE (coefficient of thermal expansion) mismatch can lead to buckling of the hinge along with dramatic shift of the resonant frequency or even catastrophic failure.

SUMMARY OF THE INVENTION

The issues and problems discussed above are addressed by the present invention by providing methods and apparatus that comprise a pivotally oscillating structure including apparatus for adjusting the frequency of the pivotal oscillations. The oscillating structure is a MEMS device comprising a functional surface, such as for example, a reflecting surface or mirror, supported by a pair of torsional hinges. The pair of torsional hinges enables the functional surface or mirror to pivotally oscillate, and each hinge extends from the functional surface to an anchor member. The anchor member may comprise a single support frame or a pair of support pads and is mounted to the support structure. The oscillating structure also includes apparatus mounted to the support structure, the MEMS device or in the packaging for changing the stress on the pair of torsional hinges supporting the functional surface. As an example, a piezoelectric device mounted to the support structure can contract or expand in response to an electrical control signal. This selected movement of the piezoelectric device can be used to relieve or counteract tensional or compressional stress in the torsional hinge or alternately, the piezoelectric device can create additional torsional or compressive forces in a torsional hinge. The electrical control signals may be generated by a sensor that monitors a parameter of the pivotally oscillating mirror such as the resonant frequency or the scan velocity and then provides a feedback signal to the control circuit that uses the feedback signal to generate an appropriate signal to either provide compression forces to the hinges if the resonant frequency is too fast or tension forces if the resonant frequency is too low. Various types of monitors or sensors may be employed to provide the feedback signals, but a piezoelectric or piezoresistive element has been found to be suitable.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIGS. 4A, 4B and 4C illustrate various embodiments of dual-axis mirror devices;

FIGS. 9A and 9B, 10A and 10B, and 11A and 11B illustrate different arrangements for using a piezoelectric drive circuit to generate the inertially coupled resonant scanning or pivoting about the torsional axis of a mirror;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Like reference numbers in the figures are used herein to designate like elements throughout the various views of the present invention. The figures are not intended to be drawn to scale and in some instances, for illustrative purposes, the drawings may intentionally not be to scale. One of ordinary skill in the art will appreciate the many possible applications and variations of the present invention based on the following examples of possible embodiments of the present invention. The present invention relates to a torsional hinged structure or apparatus with a moveable functional surface, such as a reflecting surface, and is particularly suitable for use to provide the repetitive modulated scans of a laser printer or the raster scan of a projection display device. The mirror apparatus of this invention includes a single axis resonant mirror according to one embodiment. A second embodiment uses a single two-axis resonant mirror for providing spaced and parallel scan lines. The first axis provides the resonant pivoting, and the second axis allows continuous adjusting of the "vertical" movement of the beam with respect to the raster scan movement.

Figure 1:
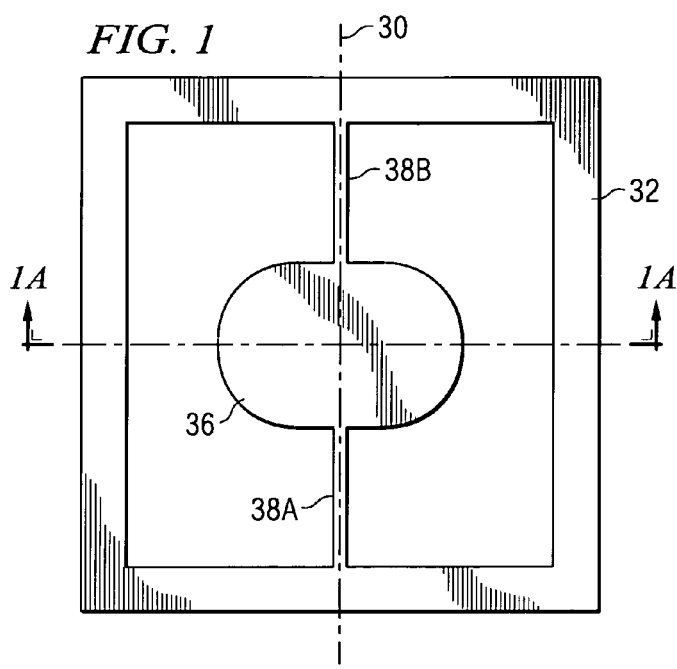
FIG. 1 illustrates an example of a single axis resonant functional surface, such as a mirror surface, having a support frame for generating a beam sweep.
Figure 1A:
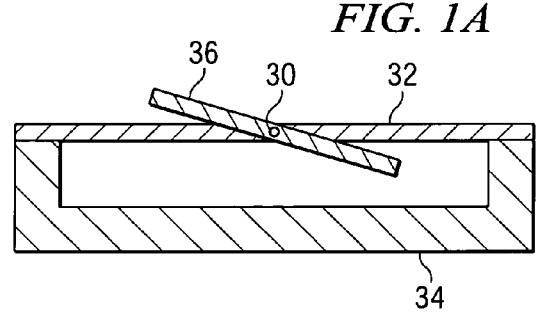
FIG. 1A is a cross-sectional view taken along line AA of FIG. 1.

Referring now to FIG. 1, there is shown a top view of an apparatus having a single pair of torsional hinges for pivoting around a first axis 30. As shown, the apparatus of FIG. 1 includes a support member 32 suitable for mounting to a support structure 34 as shown in FIG. 1A. FIG. 1A is a simplified cross-sectional view taken along line 1A-1A of FIG. 1. Although the apparatus and methods of this invention are suitable for adjusting the resonant pivoting frequency of any torsional hinged functional surface 36, this invention is ideally suited for use with a device wherein the functional surface 36 is a reflective surface or mirror portion attached to support member 32 by a pair of torsional hinges 38A and 38B. The torsional hinged mirror having a resonant frequency is suitable for use as the scanning engine of a laser printer or image display. Consequently, the following discussion will be with respect to a pivotally oscillating mirror, but it is not intended to be limited to such use unless so limited by the claims.

Therefore, as will be discussed in more detail hereinafter, the functional surface or reflective surface portion 36 may be made to pivot or oscillate about axis 30 in response to various types of drive circuits. For example, the functional surface, such as a mirror, may be driven to resonance for providing a repetitive beam sweep by electrostatic or piezoelectric drive circuits. Although particularly suited for providing a slower speed with greater precision, electromagnetic drive circuitry may also be used. When a mirror apparatus is driven by an electromagnetic circuit, small magnets are typically included as indicated by dashed line areas 40A and 40B located on tabs 42A and 42B of FIG. 2A. The magnets are mounted on the tabs 42A and 42B to avoid degrading the reflective surface 36.

Figure 2A:
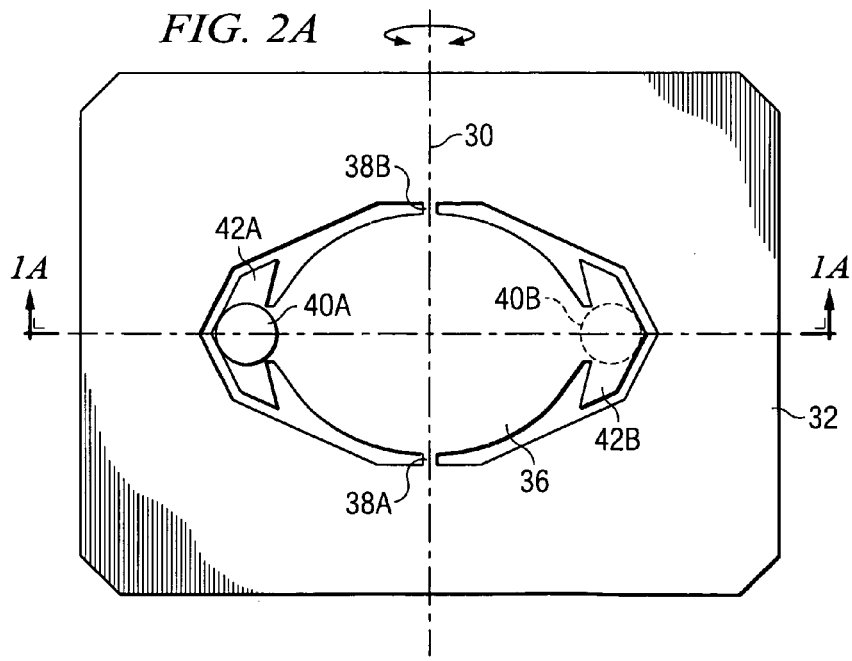
FIG. 2A is still another embodiment of a single axis torsional hinged surface or mirror.
Figure 2B:
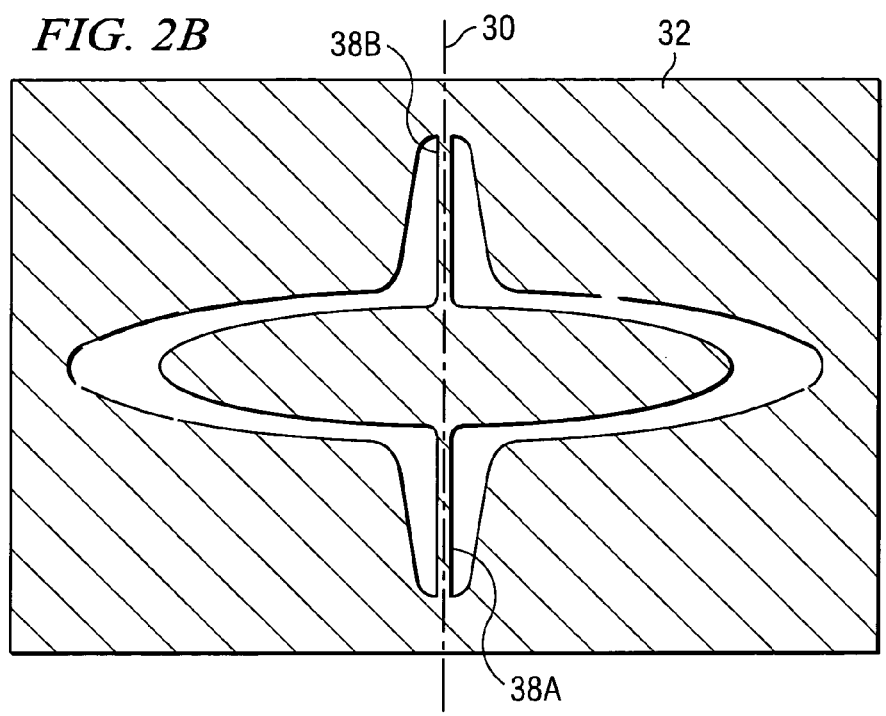
FIG. 2B is an illustration of another embodiment of a single axis elongated ellipse-shaped torsional hinged functional surface such as a mirror suitable for use with the present invention.
Figure 2C:
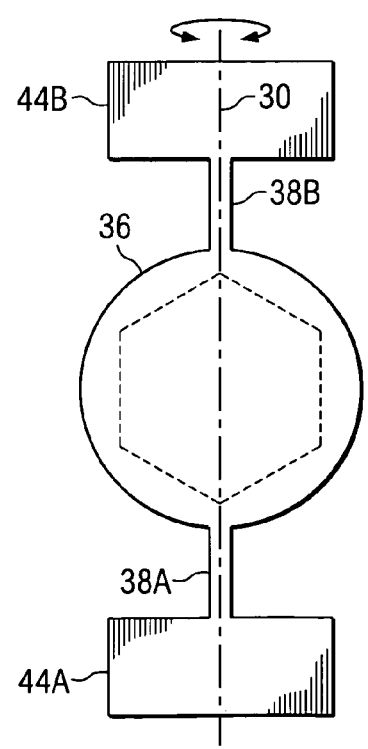
FIG. 2C is a top view of an alternate embodiment of a single axis torsional hinged functional surface or mirror supported by a pair of hinge anchors rather than a support frame.

Although the apparatus of FIG. 1 includes a support member or frame 32, functional surface 36 may be manufactured by eliminating the support member 32 and extending the torsional hinges 38A and 38B from the functional surface or mirror 36 to a pair of hinge anchors 44A and 44B as shown in FIG. 2C. The hinge anchors are then attached or bonded to the support structure 34 as shown in FIG. 1A. FIG. 2C also illustrates that the mirror or reflective surface portion 36 may have any suitable shape or perimeter such as the hexagon shape indicated by dotted line 46. Other suitable shapes may include oval, square or octagonal. For example, FIG. 2B illustrates a mirror found to be suitable for use in providing a resonant beam sweep. As can be seen, the mirror portion 36A is a very elongated ellipse shape having a long dimension of about 5.5 millimeters and a short dimension of about 1.2 millimeters.

Figure 3:
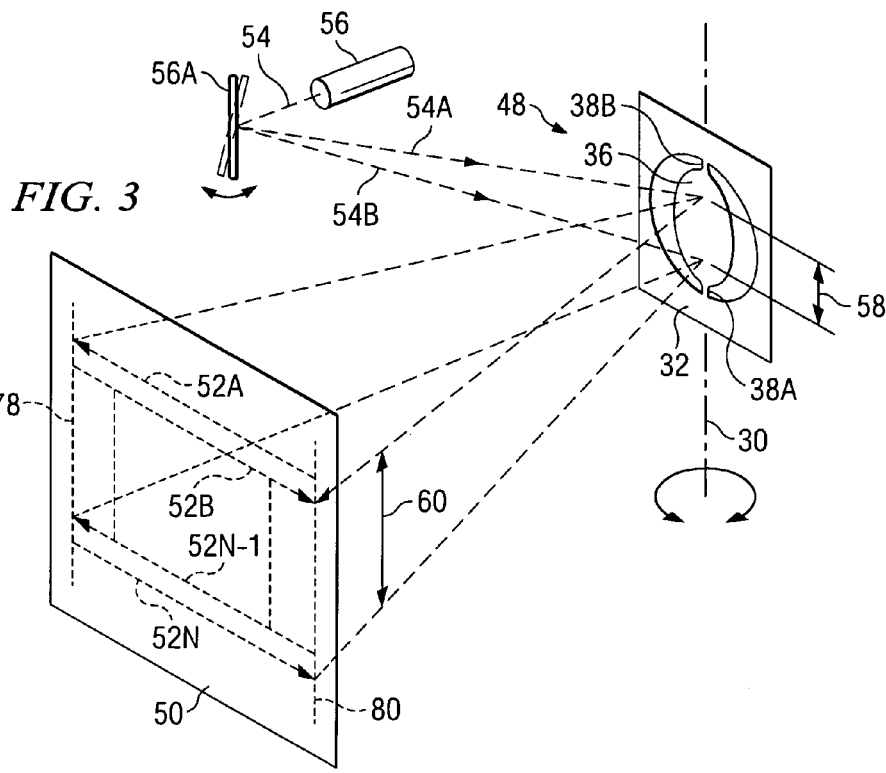
FIG. 3 illustrates the use of a torsionally hinged mirror device as a scanning engine.

As shown in FIG. 3, there is a perspective illustration of an embodiment of a scanning engine using a mirror that pivots about a single axis, such as the single axis mirrors shown in FIG. 1 through FIG. 2C. In addition, although FIG. 1 through FIG. 2C illustrate a single axis mirror, various types of dual axis mirrors, including those shown in FIGS. 4A, 4B and 4C to be discussed hereinafter, can be used to provide vertical or orthogonal motion in addition to the scanning motion.

Referring now to FIG. 3, a single axis analog torsional hinged mirror is illustrated as the scanning engine for a resonant scanning mirror type projection display or laser printer. As shown, there is a mirror apparatus 48 such as discussed above with respect to FIG. 1 through FIG. 2C that includes a support member 32 supporting a mirror or reflective surface 36 by the single pair of torsional hinges 38A and 38B. Thus, it will be appreciated that if the mirror portion 36 can be maintained in a resonant state by a drive source, the mirror can be used to cause a resonant oscillating light beam across a photosensitive medium target 50. As will be appreciated by those skilled in the art, the oscillating light beam may be a series of modulated scanning beams for forming an image on the photoresist medium.

Thus, the system of the embodiment of FIG. 3 uses the single axis mirror apparatus 48 to provide the right to left, left to right resonant sweep as represented by dotted lines 52A, 52B, 52N-1 and 52N. The up and down control of the beam trajectory, if necessary, can be achieved by locating a second single axis mirror apparatus such that the reflective surface or mirror portion 36A intercepts the light beam 54 emitted from light source 56 and then reflects the intercepted light to the mirror apparatus 48 which is providing the resonant sweep motion. Double-headed arrow 58, and dashed lines 54a and 54b shown in FIG. 3 illustrate how second mirror 36A moves the light beam 54 up and down on reflective surface 36 of mirror apparatus 48 during the left to right and right to left beam sweep so as to provide parallel lines 52A, 52B through 52N-1 and 52N on a projection display screen or a moving medium 50. Double-headed arrow 60 illustrates the vertical or orthogonal positioning of the beam sweep projected from mirror surface 36 of mirror apparatus 48. Of course, when used as the scanning engine of a laser printer, the target or medium 50 will typically be moving at a speed synchronized with the beam sweep, such that the second mirror 36A (or a dual axis mirror) may not be necessary.

Referring now to FIGS. 5A and 5B, 6A and 6B and 7A and 7B, there are shown top views and side views, respectively, of techniques for driving a single axis torsional hinge mirror, similar to mirror 36 of FIG. 1, into resonance. As shown, according to these embodiments, the mirror apparatus 66 includes a support frame 68 having two long sides 70A and 70B and two short sides 72A and 72B. The two long sides 70A and 70B are mounted or bonded to a support structure 74 by an adhesive or epoxy by means of stand-offs 76A and 76B. Also as shown in the side view of FIG. 5B, support structure 74 defines a cavity 78. A mirror or reflective surface portion 80 is attached to the two short sides 72A and 72B by a pair of torsional hinges 82A and 82B such that the mirror or reflective surface portion 80 is located above the cavity 78. As is clearly shown, the perimeter of cavity 78 is larger than the perimeter of reflective surface or mirror portion 80 such that the mirror can freely rotate around torsional hinges 82A and 82B without hitting the bottom of cavity 78.

As mentioned above, electromagnetic drives have been successfully used to rotate torsional hinged supported mirror 80 about the axis 84 through hinges 82A and 82B. Such electromagnetic drives may be used to set up resonance oscillation of the mirror 80 about its axis in a manner as will be discussed below, but are more useful for orthogonally positioning the resonant beam sweep in response to varying signals provided by computational circuitry. Furthermore, such electromagnetic drives require the mounting of electromagnetic coils below the mirror thereby adding cost and taking up space.

Therefore, according to one embodiment of the present invention, mirror 80 is caused to resonant about the axis 84 by electrostatic forces. Therefore, referring again to the embodiment of FIGS. 5A and 5B, there is included a pair of electrostatic drive plates 86A and 86B located below the short sides 72A and 72B of support frame 68. Also as shown in the side view of FIG. 5B, stand-off mounting members 76A and 76B are selected such that a gap 88A and 88B exists between the bottom surface of short sides 72A and 72B and the top surface of electrostatic drive plates 86A and 86B. It has been determined that selecting the thickness of the stand-off mounting 76A and 76B such that gaps 88A and 88B are between about 0.2 µm and 0.05 µm is particularly effective. An alternating voltage is then connected between the mirror support structure 68 and the electrostatic plates 86A and 86B.

As an example, and assuming the mirror is designed to have a resonant frequency about its torsional hinges that is no less than about 40 KHz when used as the scanning mirror of a display device, and between about 1 KHz and 4 KHz when used as the scanning mirror for a printer, if an alternating voltage also having a frequency substantially equivalent to the resonant frequency is connected across the electrostatic plates and the support frame 68, the mirror will begin to oscillate at substantially the frequency of the applied voltage. The actual resonant frequency of a mirror can be determined by maintaining the voltage level constant and varying the frequency of the applied voltage. A frequency at which the mirror rotation is maximum, will be the resonant frequency. The oscillations of the mirror results from the vibrational forces generated by the "on/off" electrostatic forces between the mirror support frame 68 and the electrostatic plates 86A and 86B being inertially coupled to the mirror 80 through the torsional hinges 82A and 82B. The resonant frequency of the mirror varies not only according to the size of the mirror itself, but also according to the length, width and thickness of the two torsional hinges 82A and 82B. It should be noted that in the embodiment of FIG. 5A, it is not necessary that the torsional hinges 82A and 82B be attached to the midpoint of sides of mirror portion 80. That is, the axis 84 lying through the torsional hinges 82A and 82B does not divide the mirror portion 80 into two equal parts. For example, the "bottom" portion of the illustration of mirror 80 may be larger than the "top" portion. It will be appreciated, of course, that use of the terms "bottom" portion and "top" portion is for convenience in describing the device and has nothing to do with the actual positioning of the device. Although attaching the hinges "off center" may help initiate resonance in the structure by creating an imbalance, it has been determined that resonance of the mirror may be achieved almost as quickly if the mirror is not off center. Furthermore, stresses may well be reduced and the required energy to maintain resonance may be somewhat less with a balanced arrangement.

Figure 6A:
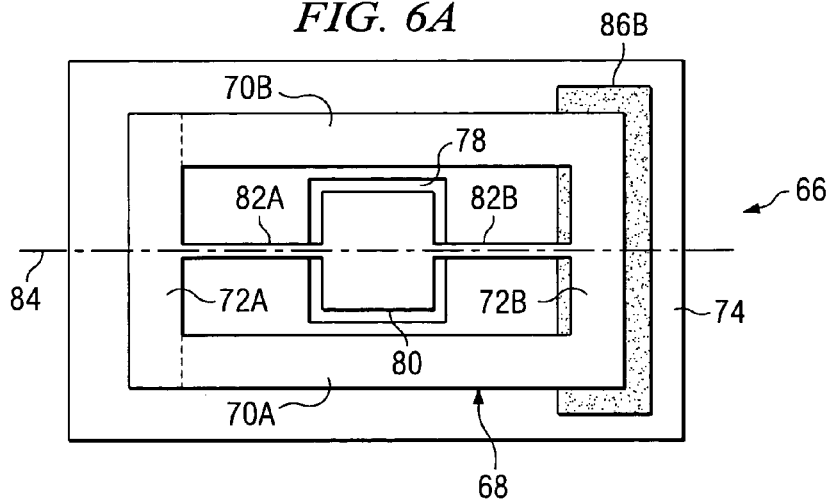
Figure 6B:
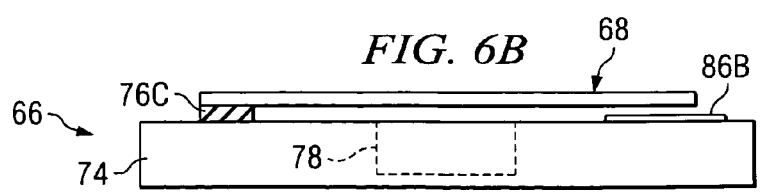

Referring now to FIGS. 6A and 6B, there is a top view and a side view, respectively, of an alternate embodiment for resonating reflective portion 80 of the mirror apparatus 66. The components of the mirror structure of FIGS. 6A and 6B are substantially the same as those for FIGS. 5A and 5B discussed above. However, rather than mounting the support frame 68 to the support structure 74 at the center point of both long side 70A and 70B, one of the two short ends such as, for example, short end 72A is mounted to support structure 74 by a single large stand-off 76C. A single electrostatic plate 86B is then located at a very small spaced distance below the other short end 72B in the same manner as discussed above with respect to FIGS. 5A and 5B. An alternating voltage source is then connected between the mirror support frame 68 and the electrostatic plate in the same manner as discussed above. The mirror support frame 68 will again vibrate in response to the on/off electrostatic attraction and the energy in turn is inertially coupled to the reflective portion 80 which begins oscillating about torsional hinges 82A and 82B in the same manner as discussed above.

Figure 7A:
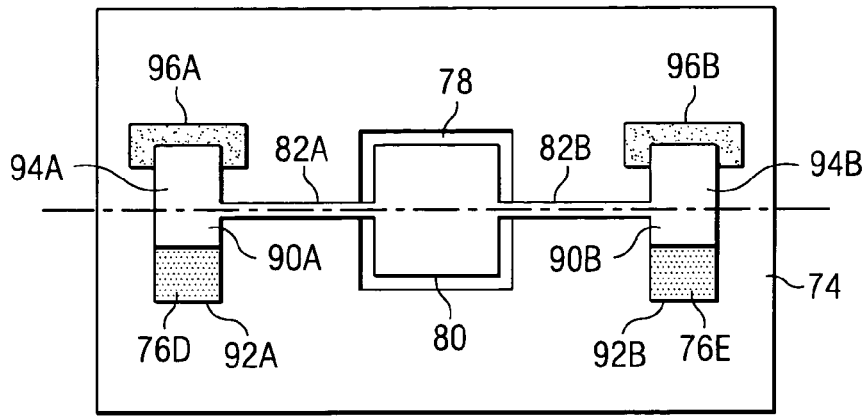
Figure 7B:
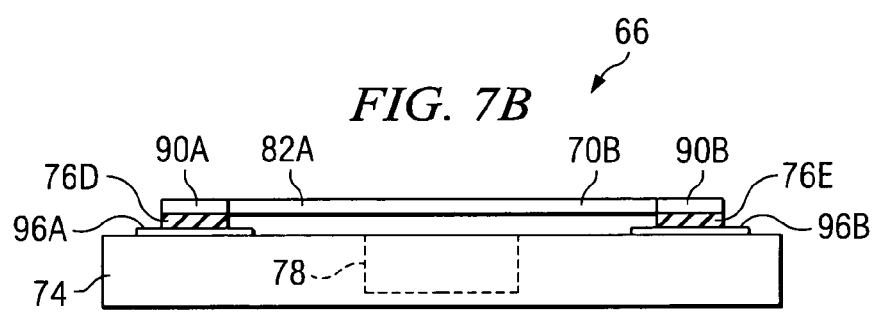

Still another embodiment is illustrated in top and side views FIG. 7A and FIG. 7B respectively. According to this embodiment, torsional hinges 82A and 82B do not extend from the reflective surface portion 80 to a support frame, but instead extend to enlarged anchor members 90A and 90B. End portions 92A and 92B of the anchors 90A and 90B are located or mounted to the support structure 74 by stand-offs 76D and 76E such that the opposite end portions 94A and 94B of each anchor are suspended or spaced above electrostatic plates 96A and 96B by a small gap. Thus, in the same manner as discussed above, an alternating voltage having a frequency substantially the same as the resonant frequency of the mirror 80 about is axis can be connected between the support anchors 90A and 90B and the electrostatic plates 96A and 96B to cause the mirror 80 to resonant and oscillate around the torsional hinges.

Figure 8:
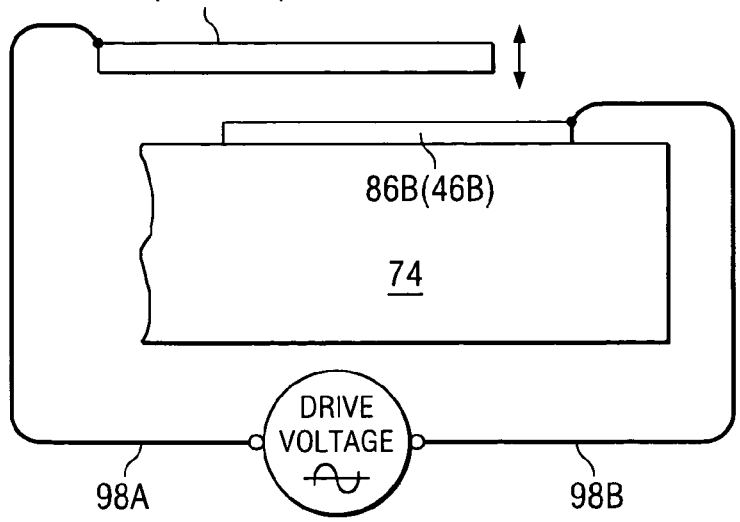
FIG. 8 illustrates the electrical connection between the electrostatic plates and the mirror assemblies of FIGS. 5A and 5B, 6A and 6B, and 7A and 7B.
Figure 11A:
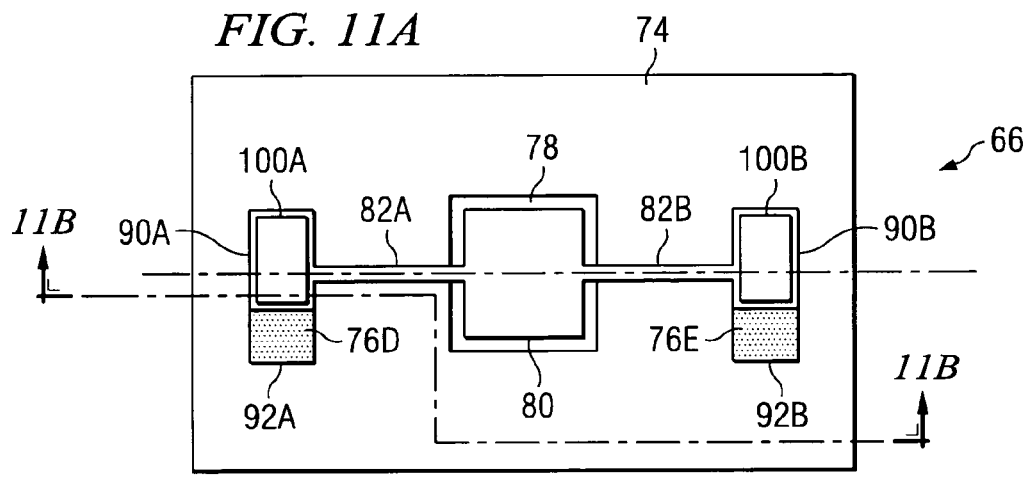
Figure 11B:
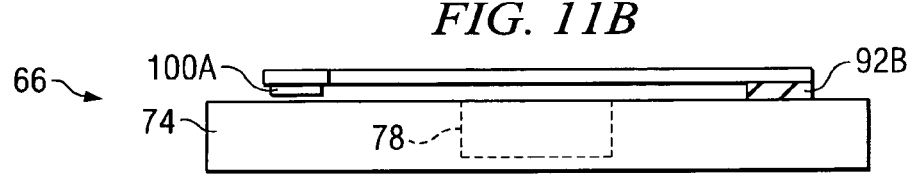

FIG. 8 is applicable to FIGS. 5A and 5B, 6A and 6B and 7A and 7B and illustrates the electrical connections 98A and 98B for applying an alternating voltage between the mirror structure and the electrostatic plates.

FIGS. 9A and 9B, FIGS. 10A and 10B, and FIGS. 11A and 11B illustrate resonant mirror arrangements mounted to the support structure in the same manner as discussed above with respect to FIGS. 5A and 5B, FIGS. 6A and 6B and FIGS. 7A and 7B respectively. However, rather than using electrostatic plates and electrostatic forces to generate resonant motion of the mirror around its torsional axis, these three embodiments employ slices of piezoelectric material 100A, 100B, 100C and/or 100D bonded to the support frame 68 and/or anchors 90A and 90B. The piezoelectric material 100A-100D is sliced such that it bends or curves when a voltage is applied across the length of the strip or slice of material. As will be understood by those skilled in the art, the response time for piezoelectric material will be very fast such that an alternating voltage will cause a strip of the material to bend and curve at the same frequency as the applied voltage. Therefore, since the material is bonded to the support frame 68 or support anchors, 90A and/or 90B, the application of an alternating voltage having a frequency substantially equal to the resonance frequency of the mirror, will cause the vibration motion to be inertially coupled to the reflective portion 80 and to thereby initiate and maintain the resonant oscillation as discussed above.

Figure 12:
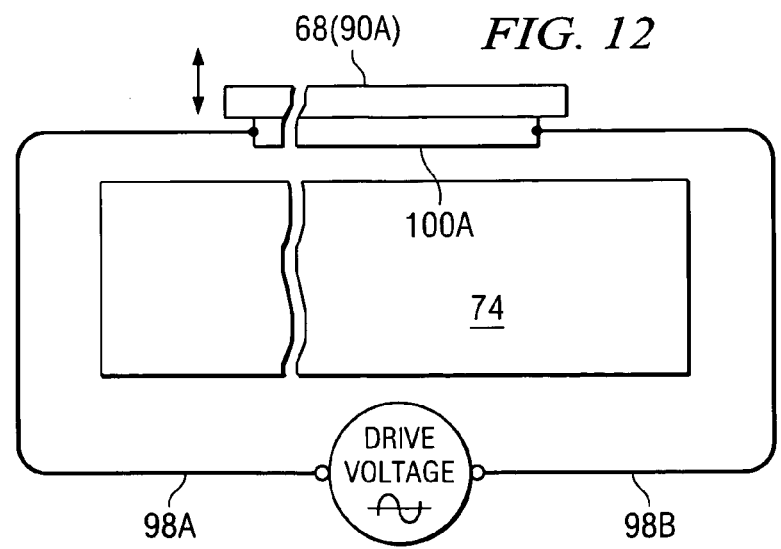
FIG. 12 illustrates the electrical connection between the piezoelectric drive material and the mirror assemblies of FIGS. 9A and 9B, 10A and 10B, and 11A and 11B.

FIG. 12 illustrates the electrical connections for providing an alternating voltage to the mirror structure and the two ends of piezoelectric materials.

Therefore, it will be appreciated that the structure discussed above with respect to FIGS. 5A through 11B for providing resonance sweeping of a mirror may be used with the mirror structure 48 of FIG. 3 to provide the resonant sweep of the mirror arrangement discussed heretofore with respect to FIG. 3.

Referring again to FIG. 4A, there is shown a perspective view of a two-axis bi-directional mirror assembly 102 which can also be used to provide modulated resonant scanning or beam sweeps across a projection display screen or moving photosensitive medium as well as adjusting the beam sweep in a direction orthogonal to the resonant oscillations of the mirror portion 104 to maintain spaced parallel image lines produced by the resonant raster beam sweep. As shown, mirror assembly 102 is illustrated as being mounted on a support structure 106. The mirror assembly 102 may be formed from a single piece of substantially planar material and the functional or moving parts may be etched in the planar sheet of material (such as silicon) by techniques similar to those used in semiconductor art. As discussed below, the functional or moving components include, for example, the frame portion 108, an intermediate gimbals portion 110 and the inner mirror portion 104. It will be appreciated that the intermediate gimbals portion 110 is hinged to the frame portion 108 at two ends by a first pair of torsional hinges 112A and 112B spaced apart and aligned along an axis 114. Except for the first pair of hinges 112A and 112B, the intermediate gimbals portion 110 is separated from the frame portion 108.

The inner, centrally disposed mirror portion 104 having a reflective surface centrally located thereon is attached to gimbals portion 110 at hinges 116A and 116B along a second axis 118 that is orthogonal to or rotated 90° from the first axis.

Figure 4A:
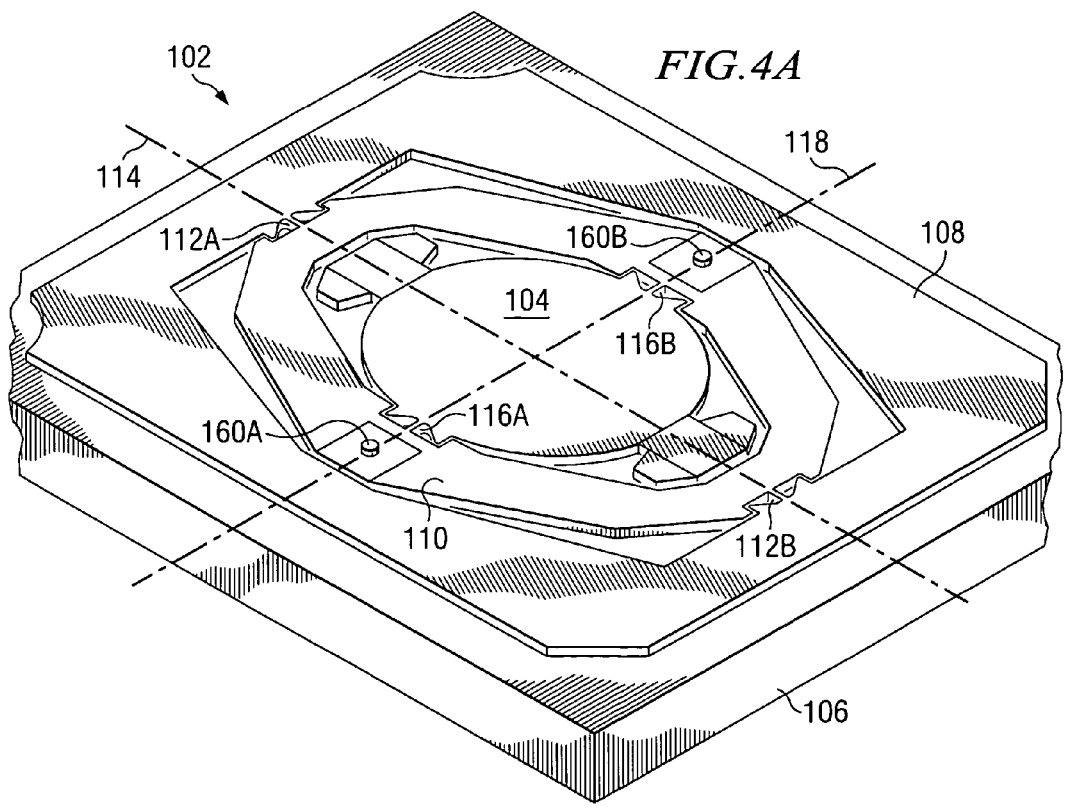
Figure 5A:
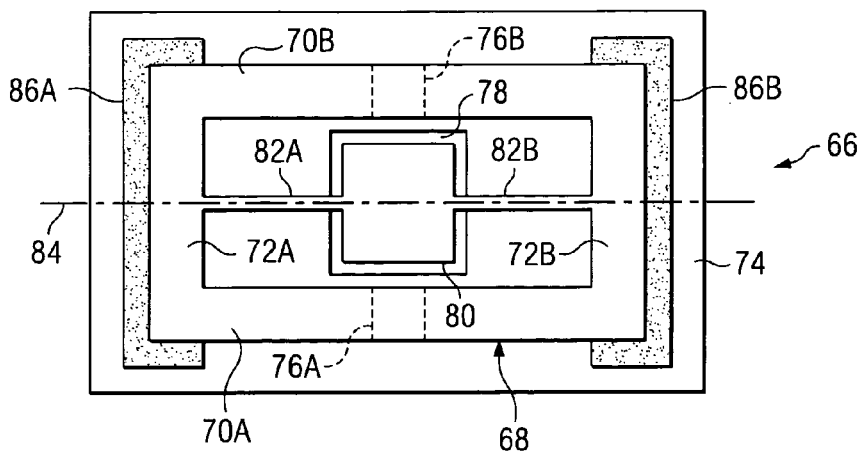
FIGS. 5A and 5B, 6A and 6B, and 7A and 7B illustrate different arrangements for using inertially coupled electrostatic drive circuitry to generate resonant scanning or pivoting about the torsional axis of a single axis mirror.
Figure 5B:
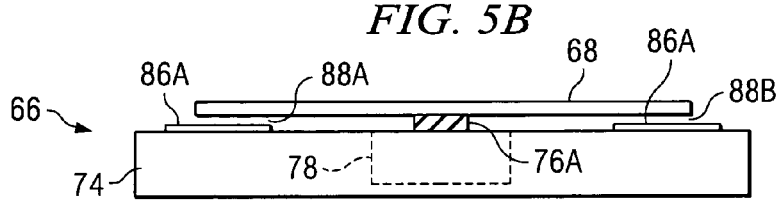

FIG. 4B is an alternate embodiment of a dual axis mirror apparatus having an elongated oval mirror portion 104A. Since the remaining elements of the mirror apparatus shown in FIG. 4B operate or function in the same manner as equivalent elements of FIG. 4A, the two figures use common reference numbers.

FIG. 4C illustrates another alternate embodiment of a dual axis mirror. In this embodiment, the outside support frame has been eliminated such that the torsional hinges 112A and 112B extend from the gimbals frame or portion 110 to hinge anchors 120A and 120B. Hinge anchors 120A and 120B are of course used to mount or attach the mirror to a support structure such 106 as discussed with respect to FIG. 4A. It should also be appreciated that the operation of the dual torsional hinged mirror of FIG. 4C operates the same as the dual torsional hinged mirror discussed with respect to FIGS. 4A and 4B.

As will be appreciated, pivoting about axis 114 will provide mirrors illustrated in FIGS. 4A, 4B and 4C the orthogonal (or vertical) motion necessary to generate a series of spaced image lines parallel to each other. Thus, by mounting reflective surface or mirror portion, such as mirror 104 or 104A, onto to gimbals portion 110 via hinges 116A and 116B, resonant motion of the mirror portion relative to the gimbals portion occurs about axis 118 and the orthogonal sweep or motion occurs about axis 114.

Figure 13A:
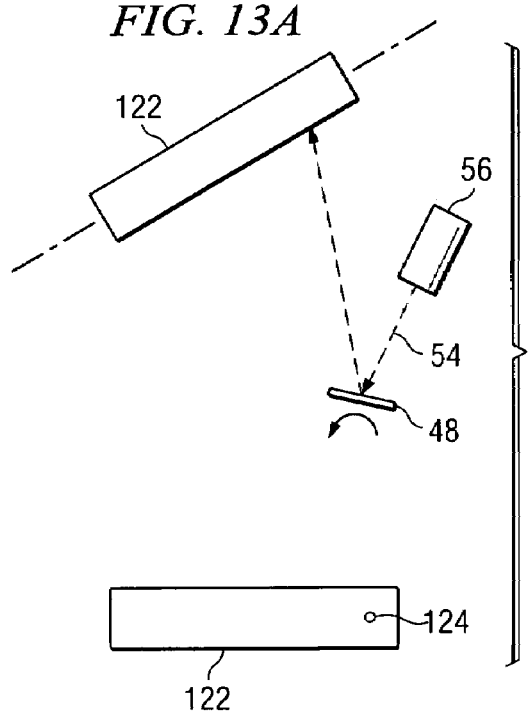
FIGS. 13A and 13B illustrate the use of a resonant mirror as a printer scan engine without orthogonal positioning.
Figure 13B:
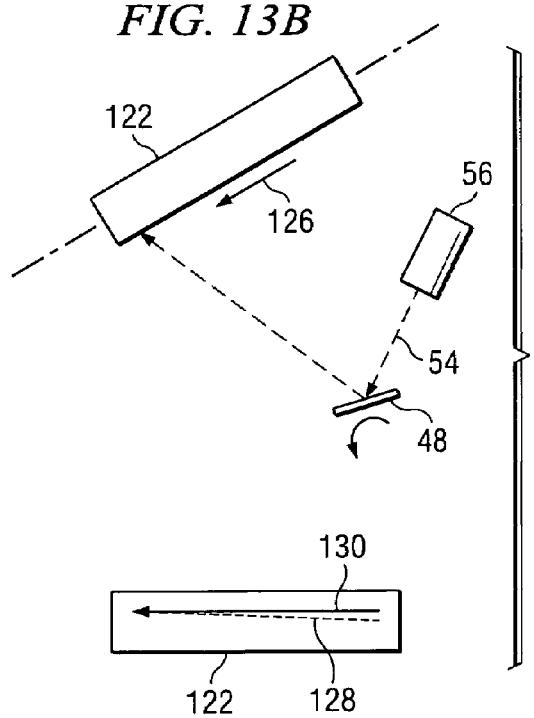

Referring now to FIGS. 13A and 13B, there is illustrated a prior art example of a laser printer using a single axis oscillating mirror 48 to generate a modulated beam sweep on a photosensitive medium such as rotating drum 122. FIG. 13A illustrates the beginning point 124 of a beam sweep by the single axis mirror 48. Likewise, FIG. 13B illustrates the beam sweep or movement as indicated by heavy arrow 126 as mirror 48 substantially completes its scan. As illustrated in the lower view of the photosensitive drum 122, for a laser printer that only uses one direction of the beam sweep, the mirror 48 may be mounted at a slight angle such that the beam sweep is synchronized with the movement of the rotating drum 122 so that the distance the medium moves is equal to the vertical distance the light beam moves during a sweep. Thus, the slightly angled trajectory as illustrated by reference number 128 results in a horizontal image line 130 on the moving photosensitive medium or drum 122.

Figure 14A:
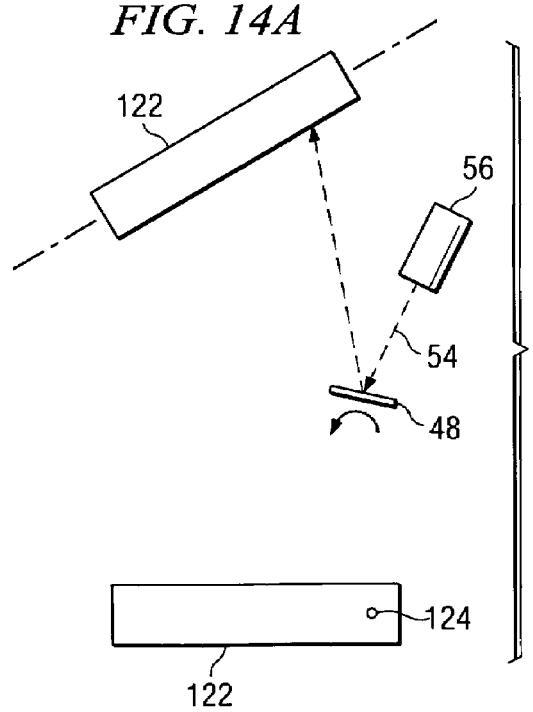
FIGS. 14A, 14B and 14C illustrate the use of a resonant mirror as a printer scan engine with orthogonal positioning. The orthogonal positioning may be provided by a dual axis resonant mirror or two single axis mirrors.
Figure 14B:
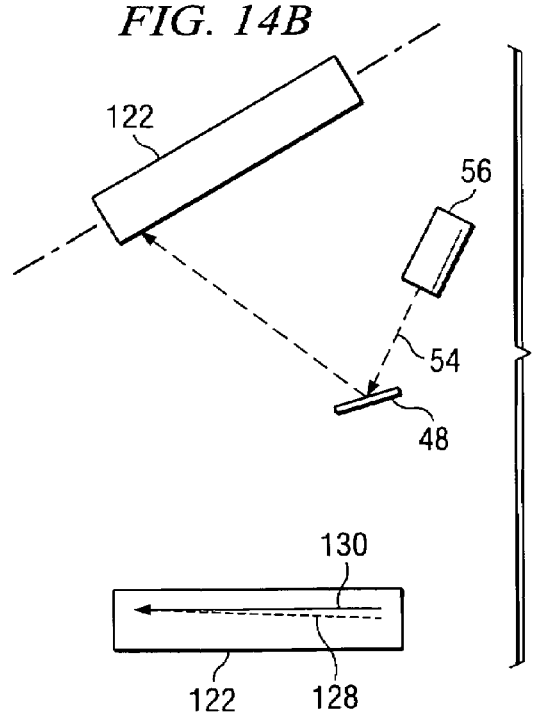
Figure 14C:
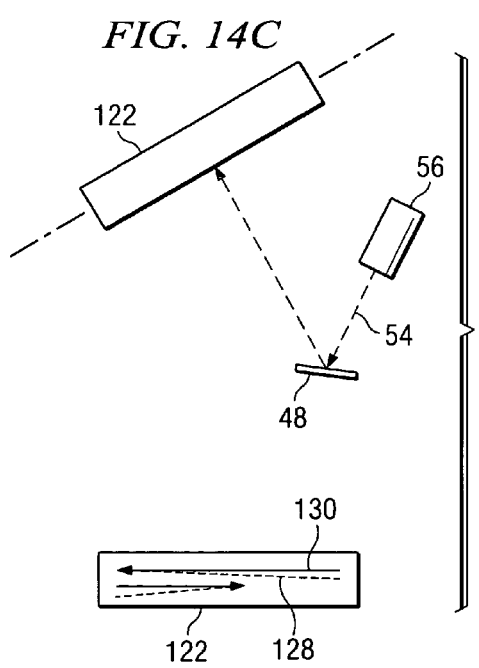

FIGS. 14A, 14B and 14C illustrate the use of a dual axis scanning resonant mirror such as shown in FIG. 4A, 4B or 4C. As can be seen from FIGS. 14A and 14B, the operation of a dual orthogonal scanning mirror assembly as it scans from right to left in the figures is substantially the same as a single axis mirror as discussed and shown in FIGS. 13A and 13B. However, unlike the single axis mirror 48 and as shown in FIG. 14C, it is not necessary to turn off the modulated laser (light beam 54 from source 56) on the return scan, since a return or left to right scan can be continuously modulated during the return scan so as to produce a printed line of images on the moving rotating drum 122. The second printed line of images, according to the present invention, will be parallel to the previous right to left scan. This is, of course, accomplished by slight pivoting of the mirror 48 around the second axis of the dual axis mirror as was discussed above.

As was discussed above, two mirrors which pivot about a single axis, such as the single axis mirrors shown in FIGS. 1, 2A, 2B and 2C, rather than one dual axis mirror could be used to produce parallel images on a printed medium. In addition, two of any of the dual or two-axis mirrors discussed above could be used to obtain the same results as achieved by using two single axis mirrors. For example, two of the two-axis mirror arrangement may be used by not providing (or not activating) the drive mechanism for one of the axes. However, if two mirrors are to be used, it may be advantageous to use two of the more rugged single axis mirrors. That is, each mirror has only a single axis of rotation and a single pair of hinges.

From the above discussions, it will be appreciated that careful regulation of the beam scan is of utmost importance. Unfortunately, the environment may also introduce various difficulties in maintaining a stable scanning engine. More specifically, changes in temperature can result in significant problems. For example, as has been discussed, the torsional hinged mirror assembly is typically made of silicon and is mounted or clamped in a fixed position during the packaging process. However, as will be appreciated by those skilled in the art, the Young's modulus of Si (silicon) varies with temperature changes. Consequently, constraining the silicon device from movement along the hinge axis will result in the resonant frequency's drifting with the changes in the temperature. Furthermore, the presence of environmental stress along the axis of the hinges will change the magnitude of the forces necessary to restore the mirror to a relaxed or neutral position with respect to the pivot angle of the mirror, this in turn will change the "scan velocity" of the engine. In addition, there may be a difference in the CTE (coefficient of thermal expansion) of the silicon mirror device and the material used as the support structure and other elements of the packaging. These differences in the CTE of the silicon mirror device and other materials used in packaging the scanning engine may produce additional stress in the torsional hinge. The effects of these stresses resulting from temperature changes, as well as stresses resulting from other sources, lead to such large variations of the resonant frequency and of scan velocity that the use of a resonant mirror as the scanning engine may be precluded or significantly restricted.

The present invention solves these difficulties and problems by methods and apparatus that maintain the resonant frequency and/or scan velocity of the pivotally oscillating mirror. The apparatus for accomplishing this comprises sensor devices that generate an electrical signal representative of a parameter of the resonant frequency and/or scan velocity. This electrical signal is used as a feedback signal to adjust the stress in the torsional hinges. The feedback signal is provided to control circuitry, which generates an electrical control or output signal. The output signal is connected to a device that can add to and/or lessen the stress in the torsional hinges of the mirror device. More specifically, a piezoelectric device may be used to alter the stress in the torsional hinges by slightly distorting the geometry of the mirror. Furthermore, because the actual scan velocity may be used as the feedback signal, the method of this invention can be used to compensate for changes inherent to the hinge material or package structure as well as changes induced by a CTE mismatch between the mirror device and the packaging materials.

Figure 15:
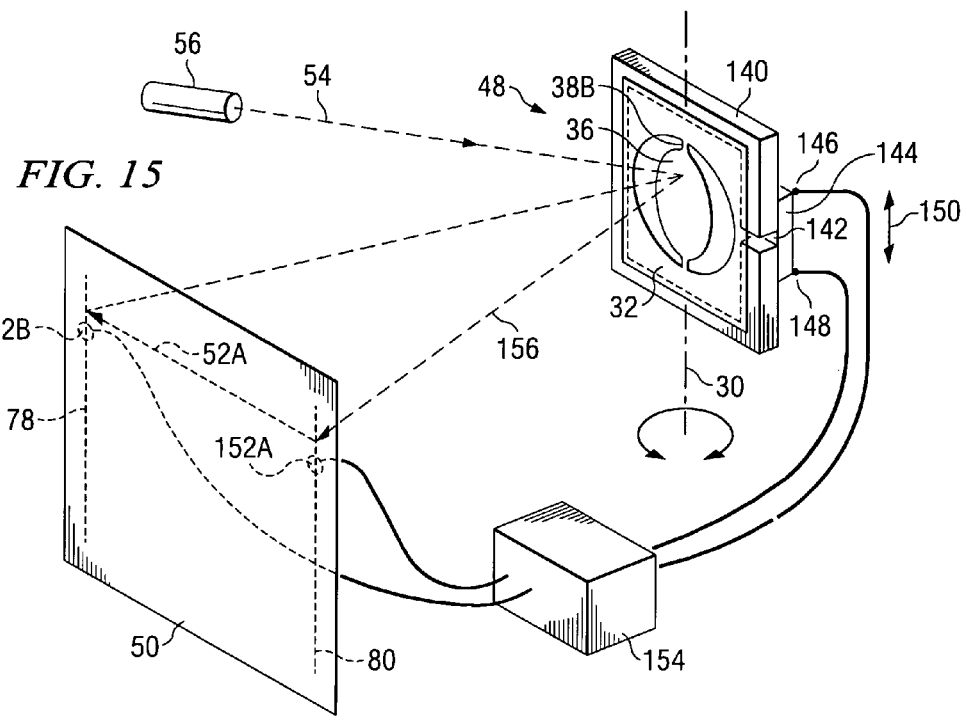
FIG. 15 illustrates one embodiment of the present invention incorporating two light sensors as used with a projection display system.

Referring now to FIG. 15, there is shown a schematic similar to the scanning engine discussed with respect to FIG. 3. Elements of FIG. 15 that are the same as discussed with respect to FIG. 3 carry the same reference numbers. Therefore, as shown, a single axis mirror device 48 is mounted to a support structure 140. However, unlike the support structure discussed above with respect to various of the drawings, the support structure 140 includes a gap 142 along one of the long sides. A slice of piezoelectric material 144 is bonded or otherwise fixedly secured to support structure 140 such that it bridges gap 142. The piece of piezoelectric material 144 is selectively sliced such that when a voltage is applied across ends of 146 and 148, the slice of material either contracts or expands as indicated by double headed arrow 150. Whether the material expands or contracts depends upon the polarity of the applied voltage or control signal. Also shown are a pair of light sensors 152A and 152B that sense when at least one beam scan of a raster sweeping across the target or display screen 50 reaches the horizontal positions indicated by dotted lines 78 and 80. Since the horizontal distance between sensors 152A and 152B is fixed, the scanning frequency can be determined by circuitry 154. Of course, if the mirror device is intended to operate at the resonant pivoting frequency in a manner as discussed above, the scanning frequency will be the same as the resonant frequency. For example, control circuitry 154 monitors the appropriate or selected parameter represented by feedback signal pulses provided by sensors 152A and 152B when light beam 156 energizes sensors 152A and 152B. After determining the value of a real time parameter, such as for example only, the resonant frequency, control circuitry 154 then generates the control signal that is provided to the slice of piezoelectric material 144 to selectively contract or expand the material so as to maintain the selected parameter between a maximum level and a minimum level. Although the actual movement or response of the slice of piezoelectric material 144 may be very small, the appropriate contracting or expanding force, as determined by control circuitry 154, will be applied to support structure 140 which in turn is coupled to the support frame 32 of mirror device 48. The forces coupled to support frame 32 result in either compression or torsional stress being applied along the torsional hinges 38A and 38B. Thus, as was discussed above, the monitored parameter can be maintained within a maximum level and minimum level. In the embodiment illustrated in FIG. 15, the scan velocity can be monitored once for every display frame.

Figure 15A:
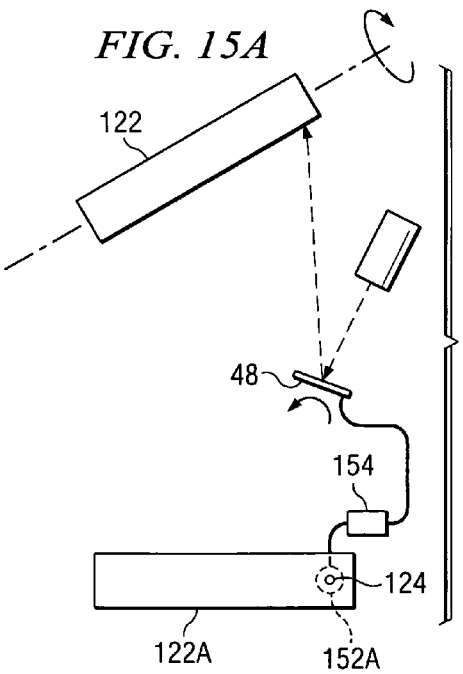
FIG. 15A shows an embodiment of the present invention incorporating a single light sensor suitable for use with a laser printer.

Referring now to FIG. 15A, there is a simplified schematic of an arrangement similar to that of FIG. 15 for use with a laser printer. However, since the photosensitive medium 122 is rotating at a constant and known speed, each scan will intersect light sensor 152A at both the beginning and end of each beam sweep. Thus, the selected parameter, such as for example only, the resonant frequency can be monitored as frequently as each scan cycle with a single sensor.

Figure 16A:
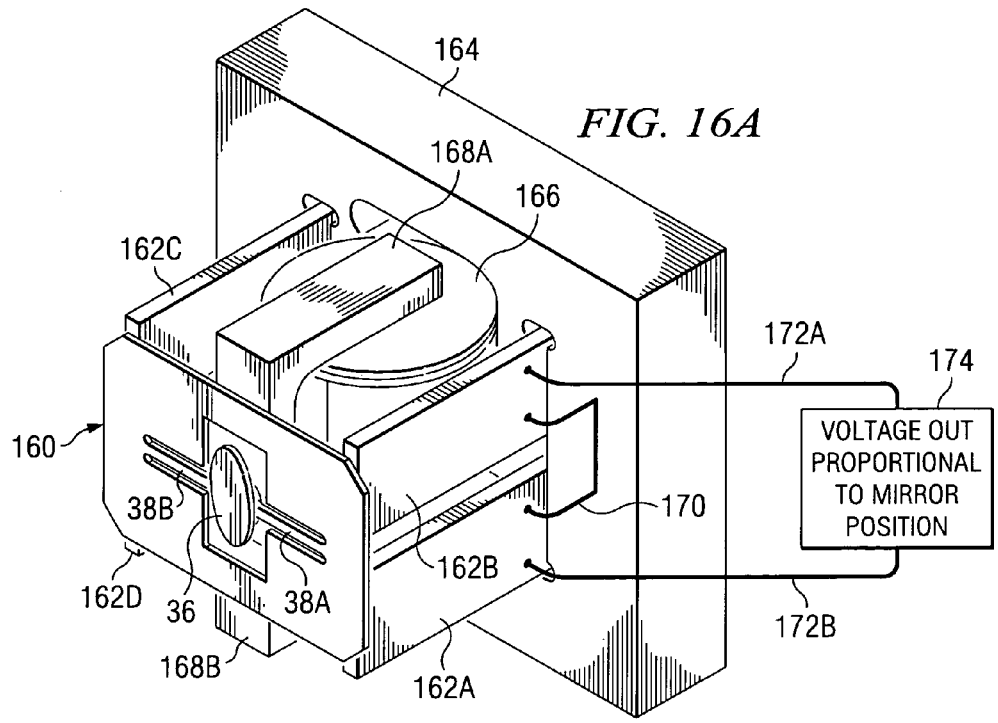
FIGS. 16A and 16B illustrate the use of a piezoelectric element and a piezoresistive element, respectively, as sensors for determining scan velocity or resonant frequency to produce a feedback signal according to the teachings of the present invention.
Figure 16B:
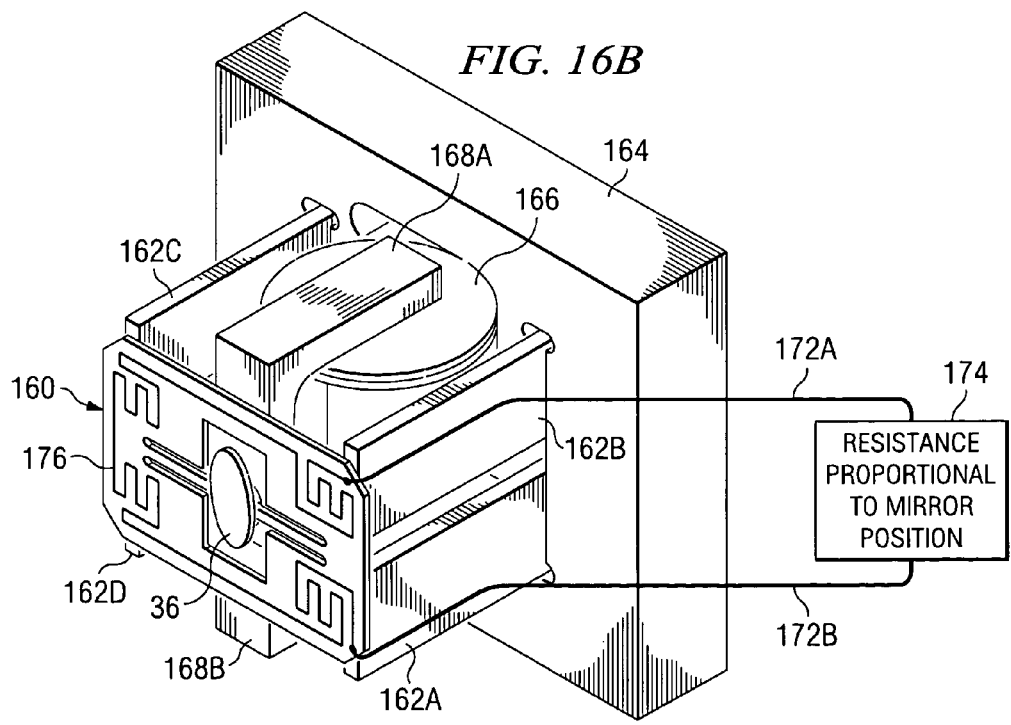

Referring now to FIGS. 16A and 16B, there is illustrated a schematic of alternate embodiments of the present invention that use piezoelectric and piezoresistive elements for monitoring the selected parameters. As shown in FIG. 16A, a single axis mirror apparatus 160 similar to those discussed in FIGS. 1-3 is bonded to and supported by four (4) piezoelectric columns 162A, 162B, 162C and 162D, which are rigidly attached to structure 164. The drive engine of this embodiment for oscillating the mirror portion 36 back and forth includes a magnetic coil 166 and a pair of electromagnetic arms 168A and 168B. The magnetic coil 166 is connected to an alternating voltage source (not shown) that provides frequency at the desired oscillating frequency, and preferably the desired frequency is the resonant frequency of the mirror 36 about torsional hinges 38A and 38B. Thus, the polarity of the electromagnetic arms 168A and 168B continuously switch back and forth. This constant switching of polarity interacts with the poles of a small permanent magnet (not shown) on the back side of the mirror 36 to maintain the resonant oscillation of the mirror.

As is well known by those skilled in the art, the piezoelectric columns 162A and 162B will be proportional to the position or movement of the mirror apparatus 160. In the embodiment illustrated in FIG. 16A, columns 162A and 162B are connected in series as indicated by jumper wire 170 such that as mirror 36 oscillates, a small compressive force occurs at one of the columns and a small tensional force occurs at the other. These forces cause an output voltage to be provided on wires 172A and 172B to the instrumentation or monitor circuit 174. The output voltage received at circuit 174 will have a frequency proportional to the resonant frequency of the mirror 36. Therefore, if the resonant frequency changes from the nominal resonant frequency, the change will be indicated in the voltage to circuitry 174 such that circuitry 174 can place a stress on the torsional hinges as necessary to maintain the resonant frequency at the nominal value.

Referring now to FIG. 16B, there is illustrated apparatus similar to that discussed in FIG. 16A except that the support columns 162A, 162B, 162C and 162D are not made of a piezoelectric material. However, a piezoresistive element 176 is applied to the mirror apparatus 160. The operation of this apparatus is similar to that discussed with respect to FIG. 16A, except movement of the mirror apparatus 160 results in a resistance change in the piezoresistive element 176 that is proportional to the mirror position. Thus, instrumentation or monitor circuitry 174 can cause a stress on the torsional hinges to maintain the resonant frequency of the mirror with acceptable limits.

Figure 17:
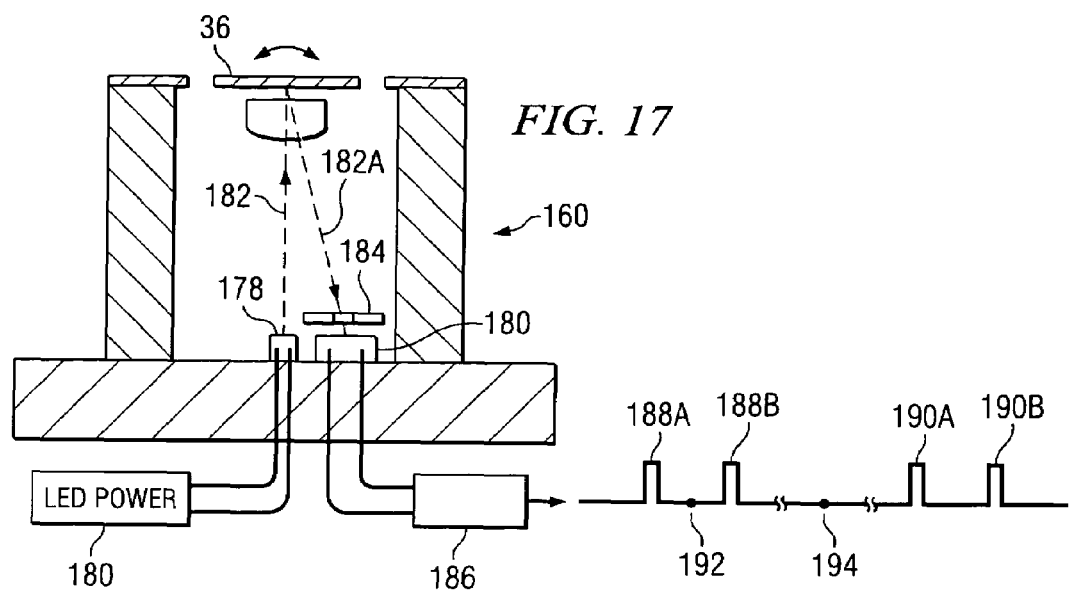
FIG. 17 illustrates the use of one or more light intensity sensors that varies with the scanning body position for determining scan velocity or resonant frequency to produce a feedback signal according to the teachings of the present invention.

Referring to FIG. 17, there is illustrated an embodiment of the present invention that uses at least one light illuminating sensor for providing a signal that varies with the position of the pivoting mirror, and can be used to determine the scan velocity.

As shown, a resonant mirror apparatus 160 is supported above an LED device 178 and a photodiode or sensor 180. The LED 178 provides a constant light beam 182 through a lens 184 to the resonant mirror 36, which reflects the beam 182A. As will be appreciated, the reflected LED beam 182A sweeps back and forth across an aperture member 184. Aperture member 184 is located proximate the end of a beam sweep from LED 178 so that the beam 182A passes the aperture in aperture member 184 as it approaches the end of a sweep, and then again as it starts a reverse sweep. Photodiode circuitry 180 is energized each time the LED beam 182A passes the aperture and provides a pair of output pulses to amplifier and conditioning circuitry 186. FIG. 17 includes a graph of the output pulses to better illustrate the invention. As shown, there is a pair of pulses 188A and 188B separated from a second pair of pulses 190A and 190B. Pulse 188A represents the LED beam sweep 182A passing over the aperture as it approaches the end of a forward sweep. Point 192 represents the end of the beam sweep, and where it reverses direction. At the beginning of the reverse sweep, the LED beam again passes the aperture and causes a second pulse 188B to be generated. The beam sweep then continues to the end of the backward sweep indicated at point 194 and starts the forward sweep and then again creates the pair of pulse 190A and 190B in the same manner as discussed with respect to pulses 188A and 188B. As was discussed above, monitoring two pulses such as 188A and 190A can be used to determine the resonant frequency of the mirror 160. However, since the beam sweep actually comes to a complete stop at each end of the sweep as it reverses direction, the resonant frequency does not determine the actual scan velocity of the mirror. Only the average scan velocity for a complete sweep can be determined. However, by creating two closely spaced pulses and knowing the distance from the aperture to the end of the beam sweep, the scan velocity of the resonant mirror can be determined.

Figure 18:
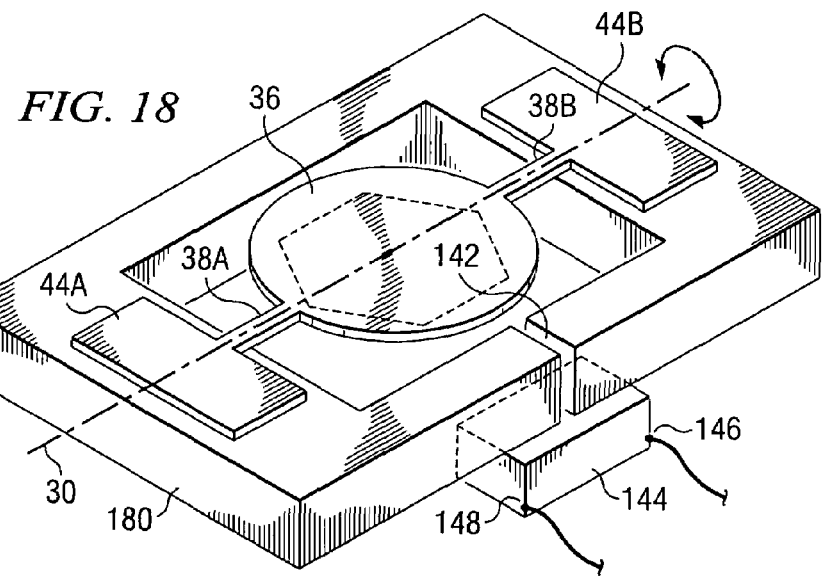
FIGS. 18 and 18A illustrate the use of a piezoelectric element mounted to a support structure for adjusting the stress loading on the torsional hinges of different types of resonant scanning mirrors.
Figure 18A:
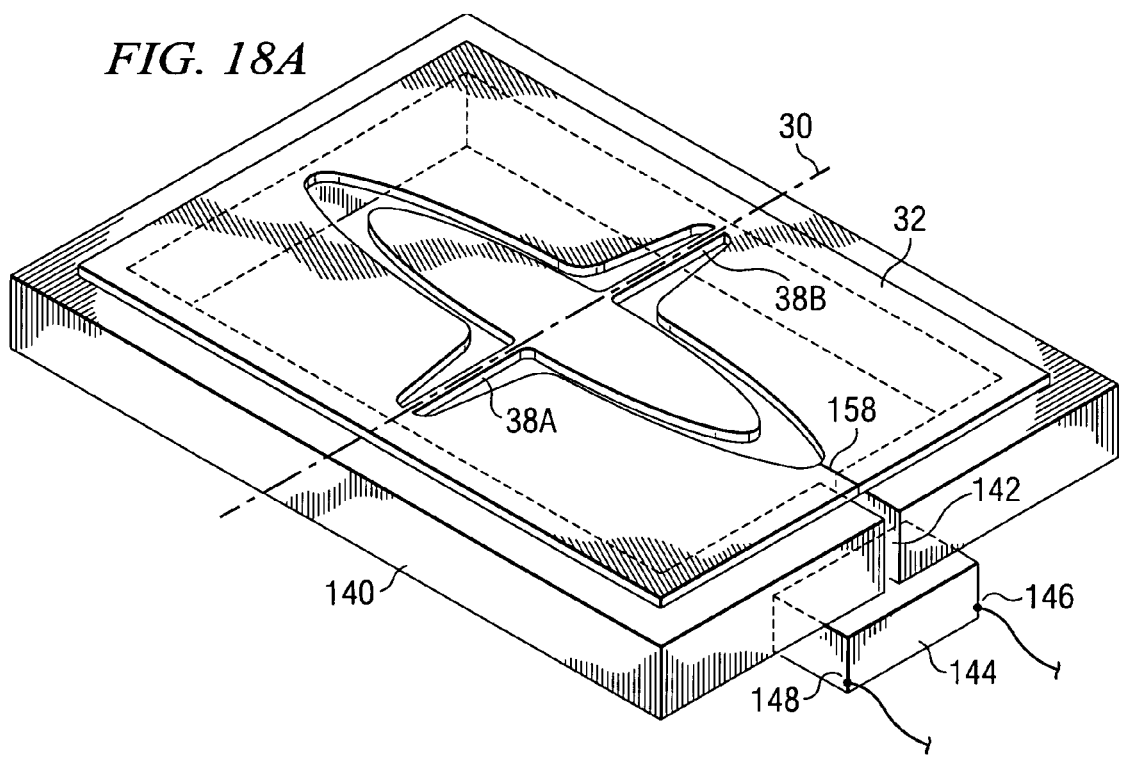

FIGS. 18 and 18A illustrate torsional hinged mirrors of the type shown in FIGS. 2A and 2B mounted for use in a scanning engine according to the teachings of the present invention. As shown in FIG. 18, the support pads 44A and 44B of the mirror devices of FIG. 2A are fixedly mounted to support structure 140. The slice of piezoelectric material 144 is also fixedly attached to support structure 140 so that it bridges gap 142. Thus, when a DC signal of a first polarity is applied across the piezoelectric material by connections 146 and 148, expansion of the material increases the gap 142. This in turn will add tension or tend to stretch torsional hinges 38A and 38B. This tension or stress coupled to hinges 38A and 38B will typically increase the resonant frequency of the pivotal oscillations. If the polarity of the DC signal is reversed, the piezoelectric material contracts or shrinks. This contracting decreases gap 142 and results in compressional stress being coupled to torsional hinges 38A and 38B. This compressional stress will tend to reduce the resonant frequency. The operation of FIG. 18A is the same as for FIG. 18, except the support frame member 32 may tend to reduce the effects of piezoelectric material 144. However, by cutting through support frame member 32 along line 158, the mirror my be even more responsive to expansion and contraction of the piezoelectric material.

Figure 19:
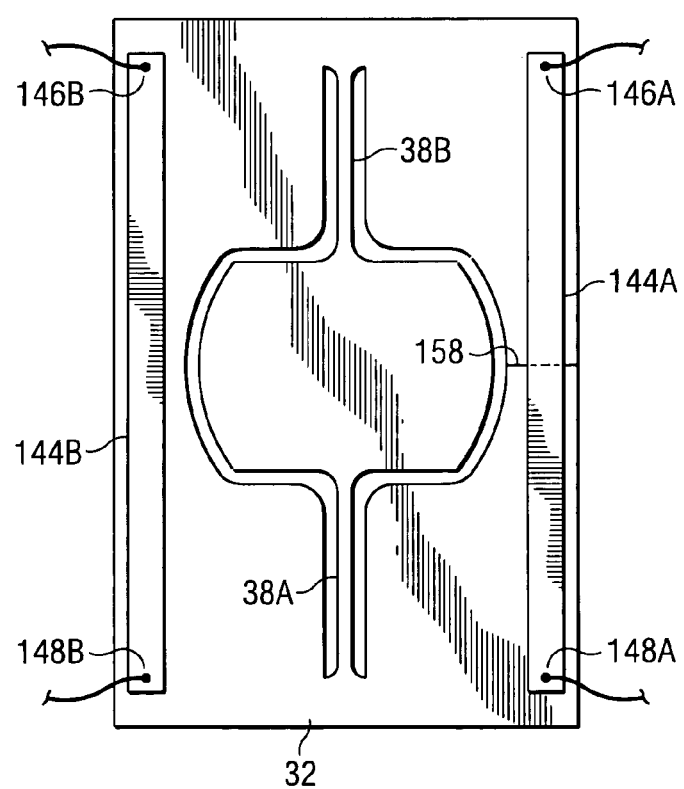
FIG. 19 illustrates the use of at least one piezoelectric element mounted to the mirror device itself for adjusting the stress loading on the torsional hinges of a resonant scanning mirror.

As shown in FIG. 19, two slices of piezoelectric material 144A and 144B are bonded or otherwise attached directly to support frame 32 for selectively providing compressive or tensional forces. However, it should be appreciated that a single slice of piezoelectric material may be sufficient. Further, to increase the effect of the piezoelectric material, support frame 32 may be cut as indicated at line 158.

It should also be understood that although one or more slices of piezoelectric material are particularly suitable for providing the desired stress to the torsional hinges, other suitable methods are also intended to be within the scope of the invention. For example only, a magnetic device, such as a solenoid (not shown), could be substituted for the slices of piezoelectric material for applying a selected force to increase or decrease the gap 142 of FIGS. 18 and 18A.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of adjusting a parameter of a pivotally oscillating structure having a functional surface comprising the steps of:
  supporting a functional surface by a pair of torsional hinges extending between said functional surface and an anchor member such that said functional surface pivotally oscillates about said pair of torsional hinges;
  mounting said anchor member to a support structure; and
  adjusting the stress loading on said pair of torsional hinges to adjust a selected parameter of said pivotally oscillating structure;
  wherein said step of adjusting the stress loading comprises the step of mounting a piezoelectrical element separate from an oscillatory drive mechanism for the functional surface and dedicated to applying said one of tension and compression forces to said pair of torsional hinges by providing electrical signals to distort said piezoelectric element.

2. The method of claim 1 further comprising the step of providing a drive force to pivotally oscillate said functional surface.

3. The method of claim 1 further comprising the step of sensing a selected parameter as said functional surface pivotally oscillates around said torsional hinges and providing a signal representative of said selected parameter.

4. A method of adjusting a parameter of a pivotally oscillating structure having a functional surface comprising the steps of:
  supporting a functional surface by a pair of torsional hinges extending between said functional surface and an anchor member such that said functional surface pivotally oscillates about said pair of torsional hinges;
  mounting said anchor member to a support structure, said support structure having a gap therein; and
  adjusting the stress loading on said pair of torsional hinges by adjusting a size of said gap to adjust a selected parameter of said pivotally oscillating structure;
  further comprising the step of monitoring a selected parameter as said functional surface pivotally oscillates around said torsional hinges and providing a signal representative of said selected parameter.

5. The method of claim 4 wherein said selected parameter is the resonant frequency of said functional surface pivotally oscillating around said torsional hinges.

6. A method of adjusting a parameter of a pivotally oscillating structure having a functional surface comprising the steps of:

supporting a functional surface by a pair of torsional hinges extending between said functional surface and an anchor member such that said functional surface pivotally oscillates about said pair of torsional hinges;

mounting said anchor member to a support structure; and adjusting the stress loading on said pair of torsional hinges to adjust a selected parameter of said pivotally oscillating structure;

monitoring a selected parameter as said functional surface pivotally oscillates around said torsional hinges and providing a signal representative of said selected parameter;

wherein said selected parameter is the scan velocity of said functional surface pivotally oscillating around said torsional hinges.

7. A method of adjusting a parameter of a pivotally oscillating structure having a functional surface comprising the steps of:

supporting a functional surface by a pair of torsional hinges extending between said functional surface and an anchor member such that said functional surface pivotally oscillates about said pair of torsional hinges;

mounting said anchor member to a support structure; and adjusting the stress loading on said pair of torsional hinges to adjust a selected parameter of said pivotally oscillating structure by applying at least one of tension and compressional forces to said pair of torsional hinges, wherein said step of applying comprises the step of mounting a piezoelectrical element for applying said one of tension and compression forces to said pair of torsional hinges by providing electrical signals to distort said piezoelectric element;

further comprising the step of sensing a selected parameter as said functional surface pivotally oscillates around said torsional hinges and providing a signal representative of said selected parameter, and the steps of receiving said signal representative of said sensed parameter, and generating said signals applied to said piezoelectric element so as to maintain the selected parameter of said pivotal oscillation of a scanning device between a selected minimum level and a selected maximum level.

8. The method of claim 7 wherein said selected parameter is the resonant frequency of a scanning device.

9. The method of claim 7 wherein said functional surface of said scanning structure is a reflective surface and further comprising the step of directing a beam of light on to said reflective surface to provide a scanning beam of light.

10. The method of claim 9 further comprising the steps of mounting said scanning structure in a printer for use as a scanning engine.

11. The method of claim 9 further comprising the step of mounting said scanning structure in a display device for use as the scanning engine.

12. The method of claim 9 further comprising the step of modulating said scanning beam of light and receiving said modulated scanning beam of light at a photosensitive target.

13. The method of claim 12 wherein said photosensitive target is a display screen and further comprising the step of moving said modulated beam of light orthogonal to said scanning motion to form an image on said display screen.

14. The method of claim 12 further comprising the step of moving said photosensitive target orthogonal to said scanning motion to form an image on said moving photosensitive target.

* * * * *

UNITED STATES PATENT AND TRADEMARK OFFICE
CERTIFICATE OF CORRECTION

PATENT NO.      : 7,659,918 B2                                             Page 1 of 1
APPLICATION NO. : 10/680928
DATED           : February 9, 2010
INVENTOR(S)     : Arthur Monroe Turner It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1643 days.

Signed and Sealed this

Twenty-eighth Day of December, 2010

David J. Kappos
*Director of the United States Patent and Trademark Office*